United States Patent [19]

Hayashi et al.

[11] Patent Number: 5,237,740
[45] Date of Patent: Aug. 24, 1993

[54] COIL INSERTION DEVICE

[75] Inventors: Mituyuki Hayashi, Nishio; Tokusuke Nakamura, Kariya; Takahiko Shimojyou, Kariya; Yasushi Oohashi, Kariya, all of Japan

[73] Assignee: Nippondenso Co., Ltd., Kariya, Japan

[21] Appl. No.: 751,760

[22] Filed: Aug. 29, 1991

[30] Foreign Application Priority Data

Aug. 30, 1990 [JP] Japan .................. 2-226564
Feb. 7, 1991 [JP] Japan .................. 3-16388

[51] Int. Cl.$^5$ ............................ H02K 15/06
[52] U.S. Cl. ......................... 29/734; 29/736
[58] Field of Search ............ 29/732, 734, 736, 596, 29/598

[56] References Cited

U.S. PATENT DOCUMENTS 3,686,735  8/1972  Hill ......................... 29/732
4,566,180  1/1986  Witwer et al. ........... 29/734 X Primary Examiner—Joseph M. Gorski
Attorney, Agent, or Firm—Cushman, Darby & Cushman

[57] ABSTRACT

The present invention generally relates to a coil insertion device for inserting a stator coil into a slot defined within a stator core of an electric rotary machine and to an improvement in a mechanism for inserting a stator coil into a slot. The coil insertion device includes a plurality of clamping guides moveable along the inner peripheries of the stator core and the base body and circumferentially arranged in a regularly spaced relationship, a plurality of coil clampers arranged radially inward and in opposition to the clamping guides for clamping a prewound stator coil in an aligned condition with the clamping guides and for shifting upward according to an upward movement of the clamping guide to draw the stator coil into the slots at a given angle of tilt, and a plurality of blades moveable along the inner periphery of the base body, the blades being formed in an essentially identical configuration and having essentially the same arrangement as the clamping guides 52, thereby permitting a stripper extending therethrough to push the stator coil into the slot by an upward movement after an insertion by the coil clampers.

5 Claims, 14 Drawing Sheets

PORTION A

COIL INSERTION DEVICE

BACKGROUND OF THE INVENTION

1. Field of the Invention

The present invention relates generally to a coil insertion device for inserting a stator coil into a slot defined within a stator core of an electric rotary machine. More specifically, the invention relates to an improvement of a mechanism for inserting a stator coil into a slot.

2. Description of the Related Art

Japanese Examined Patent Publication (Kokoku) 63-43988 discloses a coil insertion device which forms a background art of the present invention.

FIG. 1 shows the conventional coil insertion device. The device in FIG. 1 is illustrated in a position prior to inserting a coil. The shown construction will be discussed herebelow. In the exemplary construction, the device includes twelve blades 11 circumferentially arranged at predetermined intervals, for forming an annular body 13. The annular body 13 is fixed on a base plate 14 by means of an annular holder 15, and a stripper 16 is disposed within the interior of the annular body is for axial movement with respect thereto. Twelve projections 17 extend radially from the outer periphery of the stripper 16 for engagement with clearances in the annular body 13 defined by the intervals between the respective adjacent blades 11, and each of the projections 17 has a tapered shoulder 18 at the top end thereof. Wedge pushers 19 are formed integrally with the stripper 16 and extend radially from the lower end portion of the stripper. The stripper 16 is rigidly connected to a drive shaft 20 which is, in turn, connected to a hydraulic cylinder (not shown) for driving the stripper in the vertical direction. A stator core 21 is mounted on the blades 11, and defines a plurality of slots 22. A stator coil 23 is to be inserted into the respective corresponding slots 22 of the stator core 21, and wedges 24 are provided to be inserted into the slots 22 to thereby secure the associated stator coil 23.

The operation of the device set forth above will be discussed herebelow. When the stator coil 23 and the wedges 24 are to be inserted into the plurality of slots 22 in the stator core 21, by the thus-constructed coil insertion device, the wedges 24 are set on the wedge pushers 19, the stator coil 23 is hooked between the respective clearances between the adjacent blades 11, and the stator core 21 is engaged with the outer peripheries of the blades 11. FIG. 2 shows the positionin in which the coil is inserted by means of the conventional coil insertion device as set forth above. As seen from this figure, the drive shaft 20 is driven upward by the hydraulic cylinder, to thereby push the stripper 16 upward, and during this upward travel of the stripper 16, the tapered shoulders 18 of the projections 17 push the associated stator coil into the slots 22.

There are growing requirements for a higher quality insertion device with a smaller size, lighter weight, higher output, and so forth, but when an attempt is made to obtained higher density of coils in the stator core, by using of the conventional coil insertion device, the following problems may be encountered. FIG. 3(a) through 3(c) are side elevation views showing the process of the insertion of the coil by the conventional coil insertion device. As shown in FIG. 3(a), a plurality of the stator coils 23 are pushed toward the associated slots 22 by the tapered shoulders 18 of the stripper 16, and thus inserted into the slots 21, and by a further upward travel of the stripper 16, the respective stator coils 23 are forced to rotate into a vertical position to be set within the slot 22 of the stator core 21, as shown in FIG. 3(b). During this process, discrepancies such as a displacement can occur between the portions of the stator coils 23 directly pushed by the tapered shoulders 18 and the portions of the stator coils positioned away from the tapered shoulders, and as a result, the stator coils 23 can not be positioned precisely vertical, and thus are at an oblique angle with respect to the axis of the stator core 21, as shown in FIG. 3(c). Furthermore, as can be seen from FIGS. 3(b) and 3(c), the constituent conductors of the stator coils 23 set within the slots 22 are arranged at random. FIG. 4 shows a partial plan view of the stator core 23, in which the stator coils 23 are set in the slots 22. This figure shows the part of stator core 21 formed with a plurality of slots 22. The stator coils 23 are inserted into every two slots 22 by the projections 17 of the stripper 16 extending through the interval clearances 25 between the blades 11. As can be seen from FIG. 4, it was inevitable, in the conventional coil insertion device, that a relatively wide spaces to be occupied by the stator coils 23 be randomly arranged within the slots 22, and this hinders an increase of the density of the stator coils.

Furthermore, since the stator coils 23 and the wedges 24 are driven simultaneously with the common stripper, the dimensions can be fixed by a jig. This clearly limits the range of application of the axial length of the stators, for which the coil can be inserted with the common jig. Further, since all stator coils and all wedges are simultaneously driven, a substantial operating force, e.g. 2,000 kg to 4,000 kg, is required due to a high frictional resistance. Also, a tool is required for positioning the stator, but an adjustment of the position of the stator by the tool becomes difficult after the insertion of one or two layers. Therefore, there is a need for a way of adjusting the coils while avoiding interference by the tool.

Furthermore, as set forth above, the conventional coil insertion device inserts the stator coils 23, with a necessary number of conductors, simultaneously with the wedges 24. To obtain a higher quality, it is necessary to divide the required number of conductors of the stator coils into several units, to thereby insert these units one-by-one through a plurality of stages of the insertion operation, rather than inserting the necessary number of conductors at a one stage of the inserting operation. When this is performed by the conventional coil insertion device, the inserted coil unit can be forced out of the associated slot 22 by the wedge 24 simultaneously inserted with the coil.

SUMMARY OF THE INVENTION

In view of the problems set forth above, an object of the present invention is to provide a coil insertion device which can easily achieve a higher density of stator coils within associated slots.

To attain the above object, a coil insertion device, in accordance with the present invention, includes a plurality of clamp guides, coil clampers and blades. The plurality of clamping guides are movable along the inner peripheries of the stator core and the base body and circumferentially arranged in a spaced apart relationship to each other. The coil clampers are arranged radially inward and in opposition to the clamping guides and are pivotally actuated for clamping the stator coil. When clamping, the inner interconnecting sections of the stator coil positioned inside the inner periphery of the base body are clamped. The blades are movable along the inner periphery of the base body together with a stripper and have essentially the same cross sectional configuration. The clamping guides are moved in synchronism with the blades.

With the coil insertion device according to the invention, the base body, to which the stator coil is set, is moved upward to be brought into contact with the lower surface of the stator core. The clamping guide is moved downward and slides along the inner peripheries of the stator core and the base body. The blades slide on the inner periphery of the base body carrying the stripper until coming into contact with the tip ends of the clamping guide at their tip ends. Then, the coil clampers are pivoted to clamp the inner interconnecting sections of the stator coil to be moved upward. Due to this upward movement, the outer interconnecting sections of the stator coil approach outer periphery of the base body and are drawn toward the lower surface of the stator core, and then the intermediate sections of the stator coil are drawn into the slots. Accordingly, the drawing angle upon insertion of the coil is large, to thereby vertically align the stator coil at the drawing side. Subsequently, the coil clampers releases the stator coil, and after moving the clamping guide upward, the stripper and the wedge pusher are moved upward to push the stator coil into the slots through the clearances defined between the blades. Accordingly, the aligned stator coil can be clamped without a disturbance of aligned condition, and drawn to be inserted.

Therefore, the stator coil can be inserted into the slots of the stator core prior to the loading of the insertion load on the stator coil, by clamping and drawing the coil, at a substantial ratio, and thus a misalignment of the coil at the initial stage of the inserting operation can be satisfactorily prevented. Furthermore, as set forth above, by employing the drawing insertion, the coil can be inserted while maintaining the aligned position thereof. Also, since the conductors of the stator coil are maintained out of contact with the stripper until the pushing insertion is initiated, it can be maintained substantially in a straightline. This allows a higher density of the inserted coil in the slots of the stator core.

The foregoing is a discussion of a coil inserting operation in which a necessary number of conductors of the stator coil 51 are inserted with the wedges 78 by one stage of the inserting operation. In an alternative embodiment, the coil and the wedges are inserted separately from each other and the necessary number of the conductors of the stators coil are inserted by a plurality of stages of the inserting operations. Even in this case, the insertion process is the same as that discussed above, in which all of the required number of conductors are inserted by a one stage operation. The process is different after completing the insertion in that, after the required stroke of the upward movement of the stripper, to complete the inserting operation, if the stripper and the blades are simply operated to move downward, the inserted stator coil can fail out of the slots. To prevent this, the clamping guides are driven downward until the lower ends thereof reach the upper surface of the stripper. After the lower ends of the clamping guides reach the upper surface of the stripper, the stripper and the blades are driven donward, and in synchronism with the downward movement of the stripper and the blades, the clamping guides are also driven downward. Therefore, the coil within the slots cannot fall out of the slots.

Through the process set forth above, the coil can be held with the slots without inserting the wedges, and this permits an insertion of the coils by dividing the necessary number of coils into a plurality of groups. By reducing the number of conductors to be inserted at one stage of the inserting operation, the insertion load can be reduced significantly, e.g., less than half. This combination of a dividing insertion and drawing insertion makes it possible to produce a stator assembly having a remarkably enhanced quality.

BRIEF DESCRIPTION OF THE DRAWINGS

The present invention will be further described with reference to embodiments thereof, and to the accompanying drawings. Note, in the drawings, like parts are designated throughout by the same reference numerals.

DESCRIPTION OF THE PREFERRED EMBODIMENTS

Figure 1:
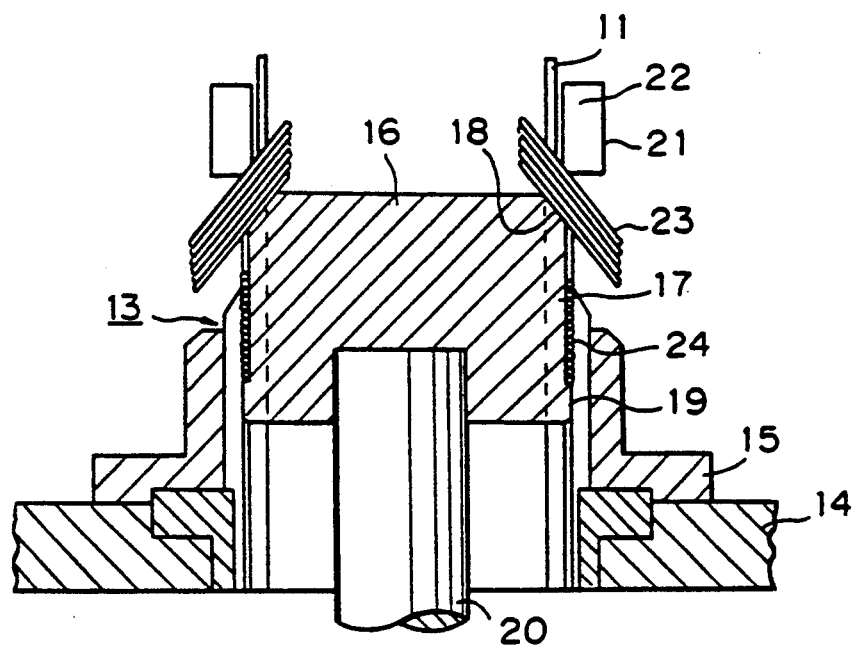
FIG. 1 shows the conventional coil insertion device in a position before inserting the coils.
Figure 2:
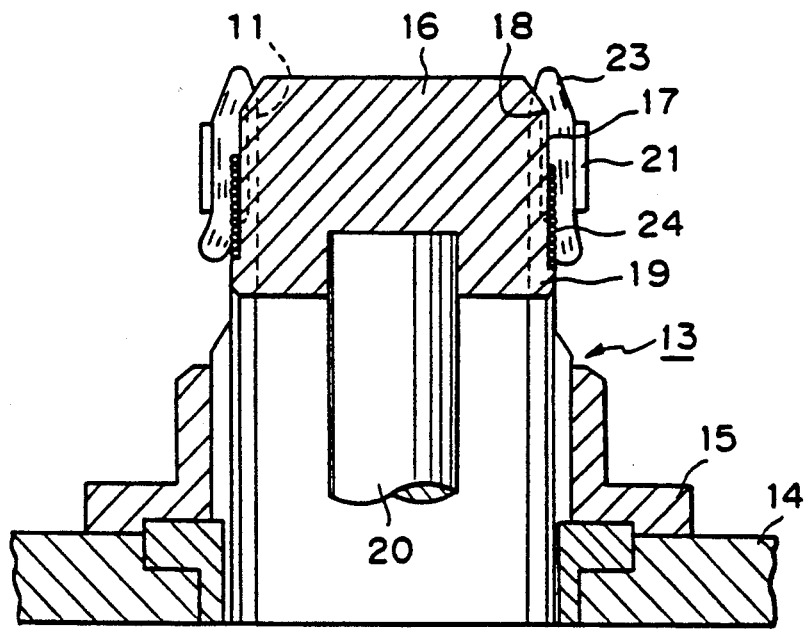
FIG. 2 shows the conventional coil insertion device in a position after inserting the coils.
Figure 3A:
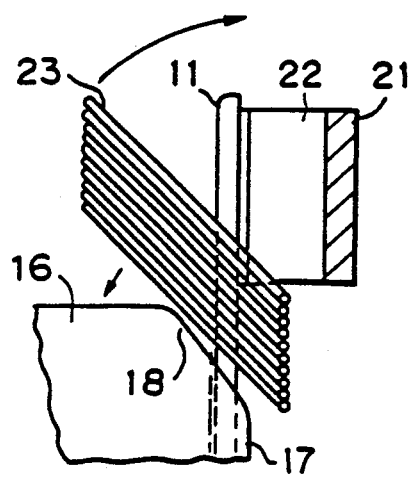
FIGS. 3(a) to 3(c) are partial side elevation views showing the coil insertion process when using the conventional coil insertion device.
Figure 3B:
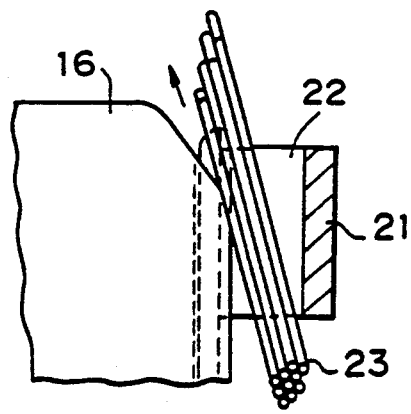
Figure 3C:
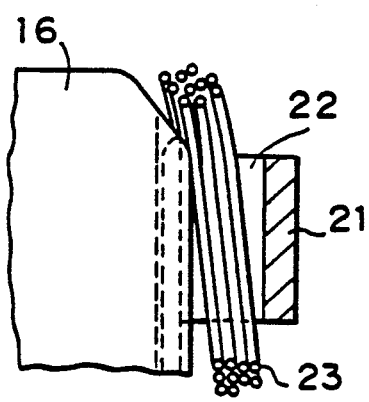
Figure 4:
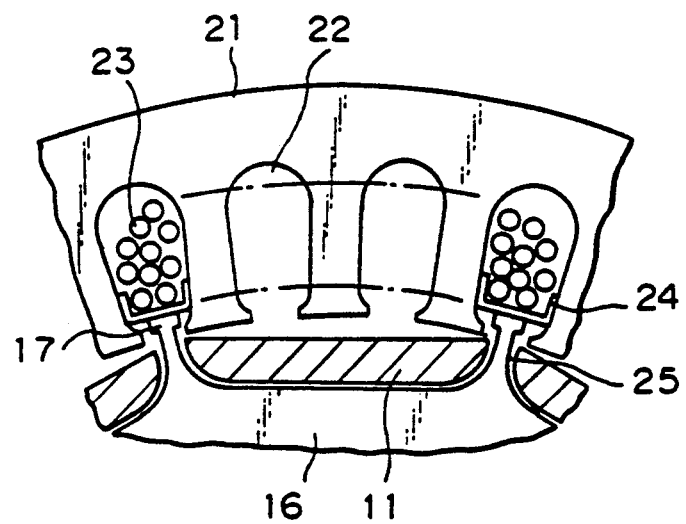
FIG. 4 is a partial plan view showing the condition of the inserted stator coil in the prior art.
Figure 5:
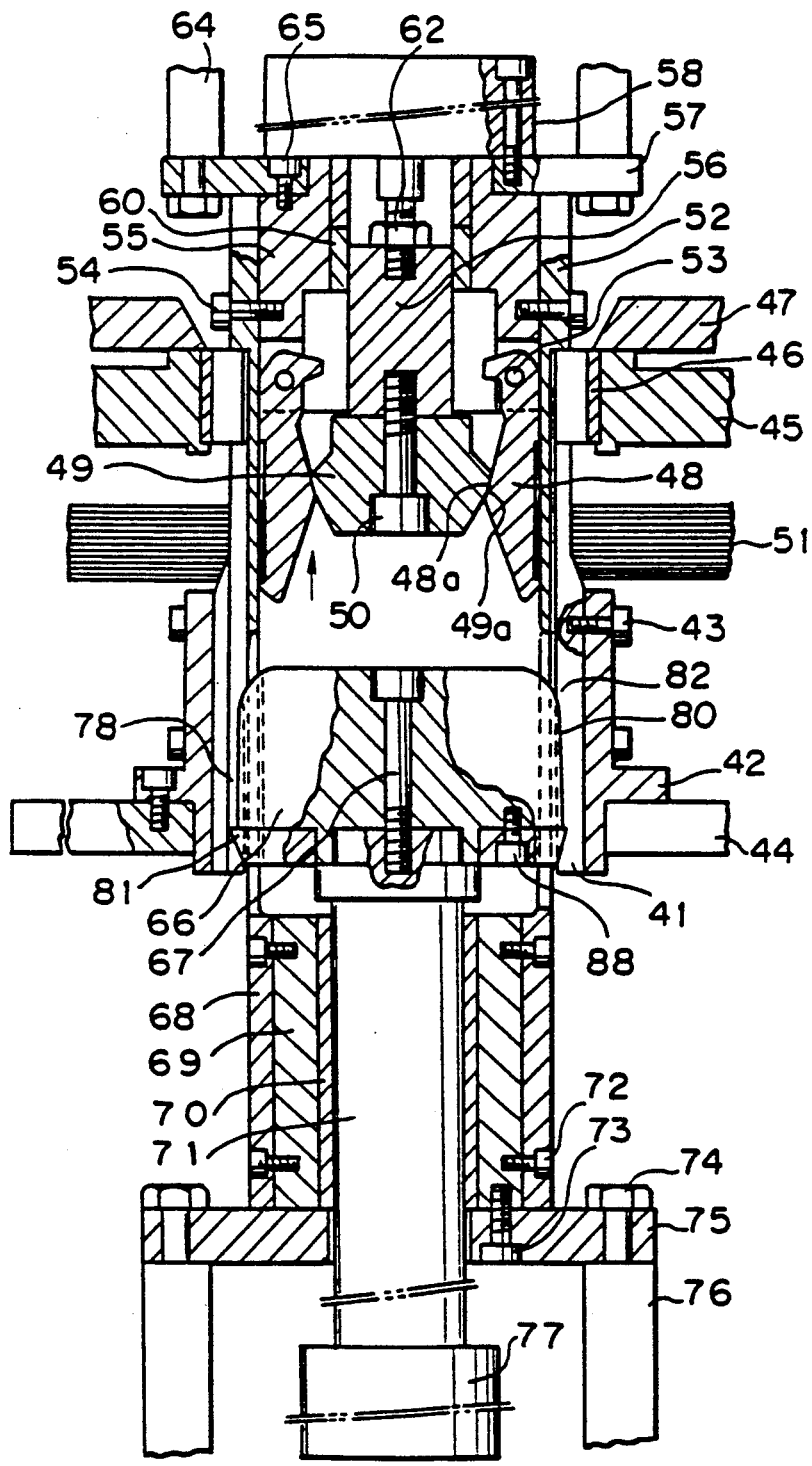
FIG. 5 is a sectional view of the preferred embodiment of a coil insertion device according to the present invention.
Figure 6A:
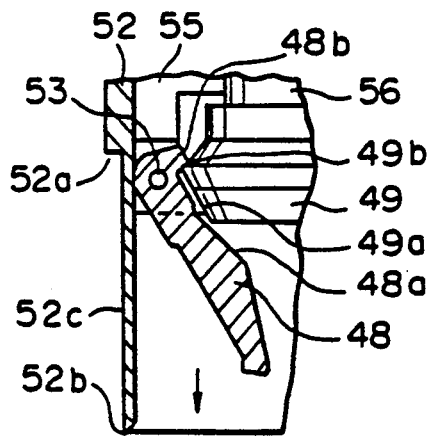
FIGS. 6A, 6B, 6C and 6D are exploded partial sections showing major parts of the preferred embodiment of the coil insertion device of FIG. 5.
Figure 6B:
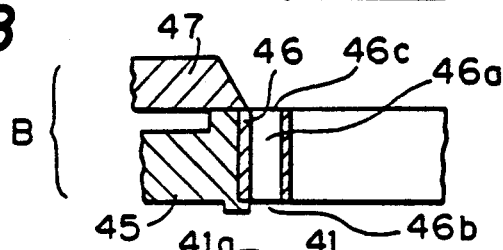
Figure 6C:
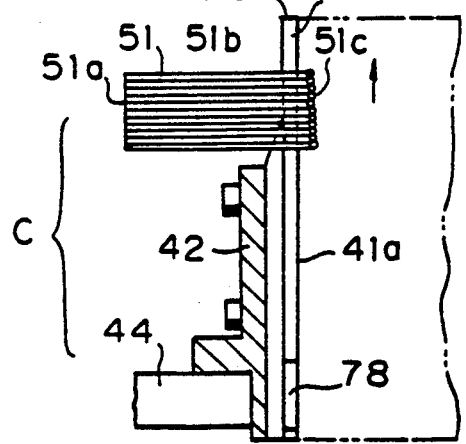
Figure 6D:
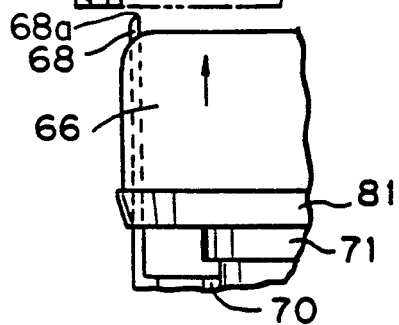

The preferred embodiment of a coil insertion device according to the present invention will be discussed with reference to the accompanying drawings. FIG. 5 is a sectional view of the preferred embodiment of the coil insertion device of the invention, and the overall construction of the preferred embodiment of the coil insertion device will be discussed with reference to FIG. 5. The device includes wedge holders 41 which serve as a base body for holding aligned stator coils before insertion. In the shown embodiment, twelve wedge holders 41 are supported on an annular body 42 and fixed to the inner periphery of the annular body by bolts 43. The annular body 42 is fixed to a plate 44 at a predetermined angular position by fastening bolts. The device also includes a core holder 45, and a stator core 46 is engaged with the core holder 45. The stator core is circumferentially positioned by a positioning groove or grooves (not shown) formed on the inner periphery of the core holder 45. The stator core 46 defines a plurality of slots 46a, each of which mates with an associated one of the wedge holders 41, at the center thereof. A thrust stopper jig 47 is provided for restricting a thrusting movement of the stator core 46, and a plurality of coil clampers 48 are arranged radially. Each of the coil clampers 48 has an inner tapered edge 48a serving as a cam face, and a ring cam 49 is provided in opposition to the clampers 48 for actuating the latter. The ring cam 49 has a cam face 49a mating with the tapered edges 48a of the coil clampers 48, for providing a depression force an the clampers 48 by a cam action. A fastening bolt 50 extends through the ring cam 49. A plurality of stator coils 51 are provided, to be inserted into the relevant slots 46a of the stator core 46, and a plurality of clamping guides 52 is provided for clamping the stator coils 51 between the associated coil clampers 48. The clamping guides 52 are slidingly movable with respect to the inner periphery of the wedge holders 41 as the base body, and with respect to the inner periphery of the stator core 46. Pivots 53 for the clampers 48, for pivotally supporting the latter, are arranged in alignment along the inner periphery of the clamping guides 52. The clamping guides 52 are circumferentially arranged at predetermined intervals and secured to the outer periphery of a holder 55. The holder 55 is secured to a base 57 by fastening bolts 65. An actuation rod 56 extends through the holder 55 and is rigidly connected to the ring cam 49 by the bolt 50. The actuation rod 56 is connected to a cylinder rod of a clamping cylinder 58, and thus the clamping cylinder 58 drives the ring cam 49 through the actuation rod 56. An adjusting nut 62 is engaged with a threaded portion of the cylinder rod, for adjusting a position of the actuation rod 56 with respect to the clamping cylinder 58. An annular bearing 60 is disposed between the outer periphery of the actuation rod 56 and the inner periphery of the holder 55, to ensure a smooth thrusting movement of the actuation rod relative to the holder when actuated by the clamping cylinder 58. The base 57 is associated with a mechanism (not shown) for driving the base in the axial direction, and therefore, the base 57 is axially movable while carrying the coil clamper 48 and the clamping guide 52, etc., directly or indirectly secured thereon. The base 57 is guided by guide bars 64, which maintain the base 57 at a predetermined angular position.

A stripper 66 is provided within the annular body 2 for axial movement therealong. The stripper 66 is connected to an actuation shaft 71 of a hydraulic cylinder 77 by a connecting bolt 67. A plurality of blades 68 are provided for a sliding axial movement along the wedge holders 41 as the base body, and the blades 68 are formed into substantially the same or a similar configuration as that of the clamping guides 2. The blades 68 are secured to the outer periphery of a bearing box 69 by fastening bolts 72, and the bearing box 69 supports an annular bearing 70 for the actuation shaft 71, on the inner periphery thereof. The bearing box 69 is maintained in coaxial relationship with the stripper 66, and is, in turn, secured to a plate 75 by fastening bolts 73. The plate 75 is fixed to the guide bars 76 by fastening bolts 74, and is designed to be driven in the axial direction with the bearing box 69, by a driving mechanism (not shown).

Wedges 78 are disposed within clearances defined between adjacent wedge holders 41, and the stripper 66 has a plurality of radial projections 80 extending from the outer periphery thereof, which radial projections 80 have rounded shoulders 82 on the upper ends thereof. Wedge pushers 81 are secured to the bottom of the stripper 66 by fastening bolts 88, and are radially extended from the bottom portion of the stripper 66 into the clearances defined between adjacent wedge holders 41. The projected amount of each wedge pusher 81 is substantially equal to the thickness of the corresponding wedge 78.

The discussion given below gives into greater detail of the major parts of the preferred embodiment of the coil insertion device according to the invention. FIG. 6 shows details of the major part of the device of FIG. 5. As can be seen from FIG. 6, the device can be separated into a coil clamping section A, a stator core holding section B, a stator coil and wedge holding section C, and a coil stripper section D.

In the coil clamping section A, the coil clamper 48 is pivotable about the pivot 53, and when the actuation rod 56 is actuated to move downward while carrying the ring cam 49, the cam face 49a of the ring cam depresses the tapered edge 48a of the coil clamper 48 to thereby depress the coil clamper toward the inner periphery of the clamping guide 52. The ring cam 49 is further provided with a cam face 49b which mates with a shoulder 48b of the coil clamper 48, and when the actuation rod 56 is actuated to shift the ring cam 49 upward, the cam face 49b comes into contact with the shoulder 48b of the coil clamper 48, to thus cause a counterclockwise pivotal movement in FIG. 6 to thereby shift the coil clamper 48 away from the clamping guide 52.

Figure 7:
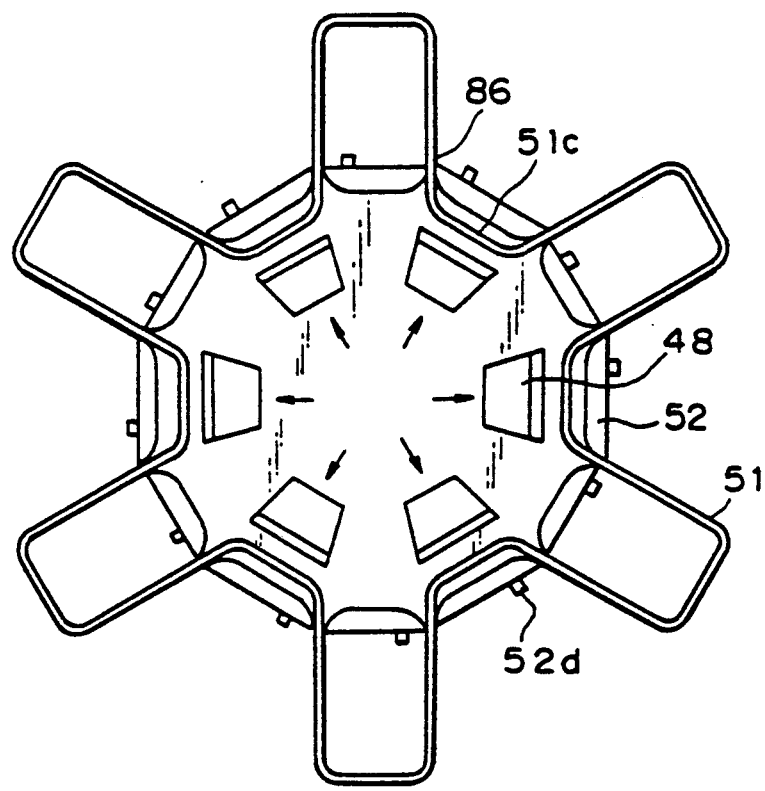
FIG. 7 is a plan view showing the relationship between a coil clamper, a clamp guide and a stator coil to be inserted.

The clamping guide 52 has a thicker wall section 52a, an outer surface 52c, and a lower end 52b. FIG. 7 shows the positional relationship between the coil clampers 48, the clamping guides 52, and the stator coils 51 to be inserted. As can be seen, twelve clamping guides 52 are arranged circumferentially, and clearances 86 are defined between adjacent clamping guides 52 to permit the stator coil 51 pass therethrough. Positioning projections 52d are projected radially from the outer surfaces 52c of the respective clamping guides 52 so that the clamping guides can be positioned with respect to an entrance opening of the slots 46a of the stator core 46, and six coil clampers 48 are arranged circumferentially and opposite to every other clamping guide 52. Inner interconnecting sections a of the stator coil 51 extend between the coil clampers 48 and the clamping guides 52 mating with the coil clampers.

In the stator core holding section B, the stator core 46 is supported on the core holder 45. The thrust stopper jig 47 is also provided, to receive a thrust load to be loaded onto the stator core 46 when the stator coil 51 is inserted. The stator core 46 has upper and lower faces 46c and 46b.

Figure 8:
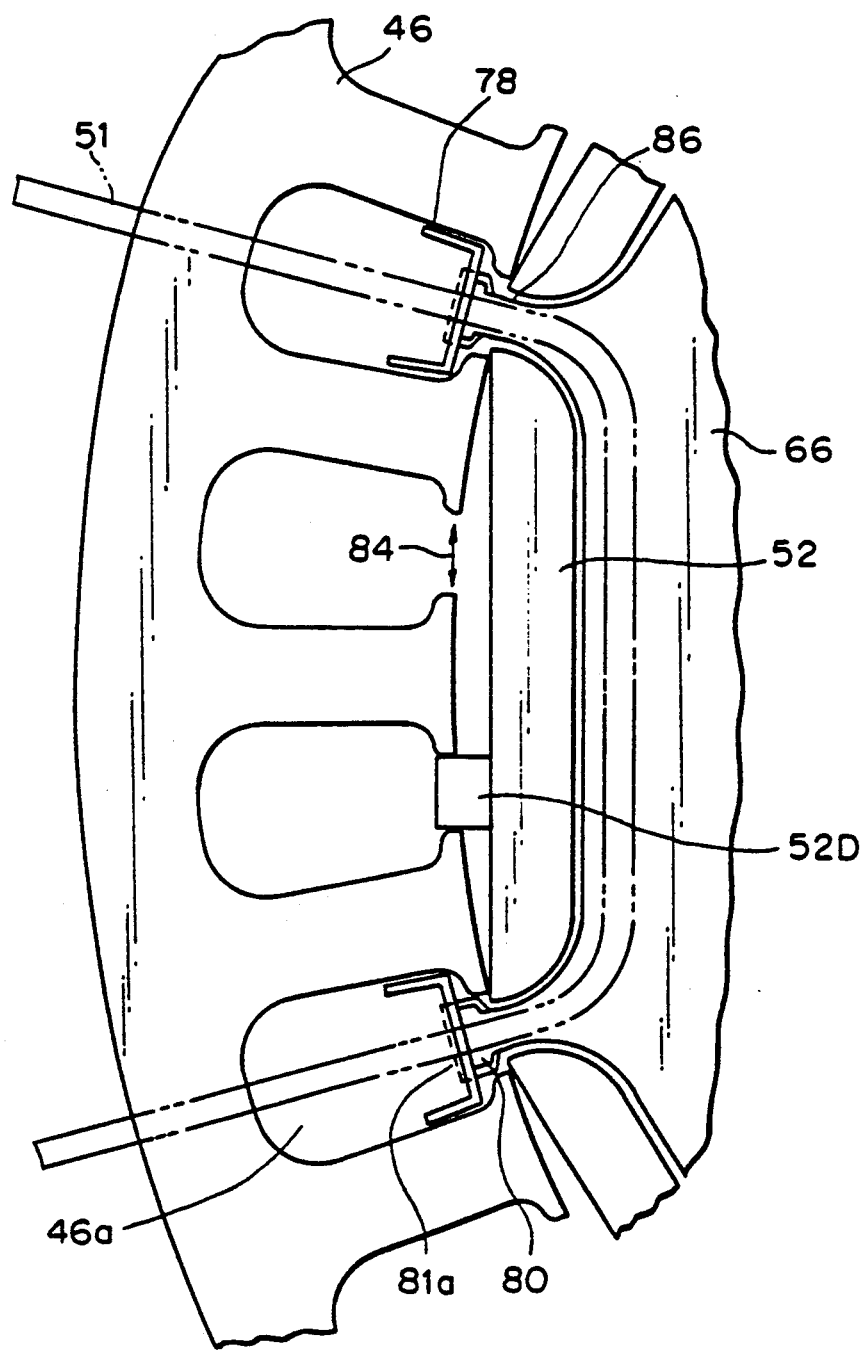
FIG. 8 is an illustration showing the relationship between a stripper, the clamp guide, a stator core and the stator coil.

In the stator coil and wedge holding section C, the wedge 78 is set within the clearance defined between adjacent wedge holders 41, which are circumferentially arranged with respect to the annular body 42 which is, in turn, connected to the plate 44. The stator coil 51 has an outer interconnecting section 51a and radially extending section 51b connecting the inner and outer interconnecting sections. The stator coil 51 is set on the wedge holders 41. The upper end 41a of the wedge holder 41 mates with the lower surface 46b of the stator core 46. The wedge holder 41 has an inner surface 41 on which the clamping guide 52 slidably moves in the vertical direction. FIG. 8 shows the positional relationship between the stripper 66, the clamping guide 52, the stator core 46, and the stator coil 51. As shown, a plurality of the slots 46a for receiving the stator coil 51 are formed in the stator core 46 in a circumferentially spaced relationship to each other, and each slot 46a has an entrance opening 84. The clearances 86 defined by the clamping guides 52 are radially aligned at every two slots, and each of the slots 46a receives the stator coil 51 pushed therein by the radial projection 80 of the stripper 66, via the clearance 86. The wedge 78, then pushed by the wedge pusher projection 81a of the wedge pusher 81, is positioned in the vicinity of the entrance opening 84, to prevent the inserted stator coil 51 from falling out of the slot 46a. As can be seen from FIG. 8, the positioning projection 52d of the clamping guide 52 is circumferentially positioned to engage with the entrance opening 84 of the slot 46a next to the slot 46a to which the stator coil is inserted, to thereby assists with the positioning of the clamping guide relative to the stator core 46.

Figure 9:
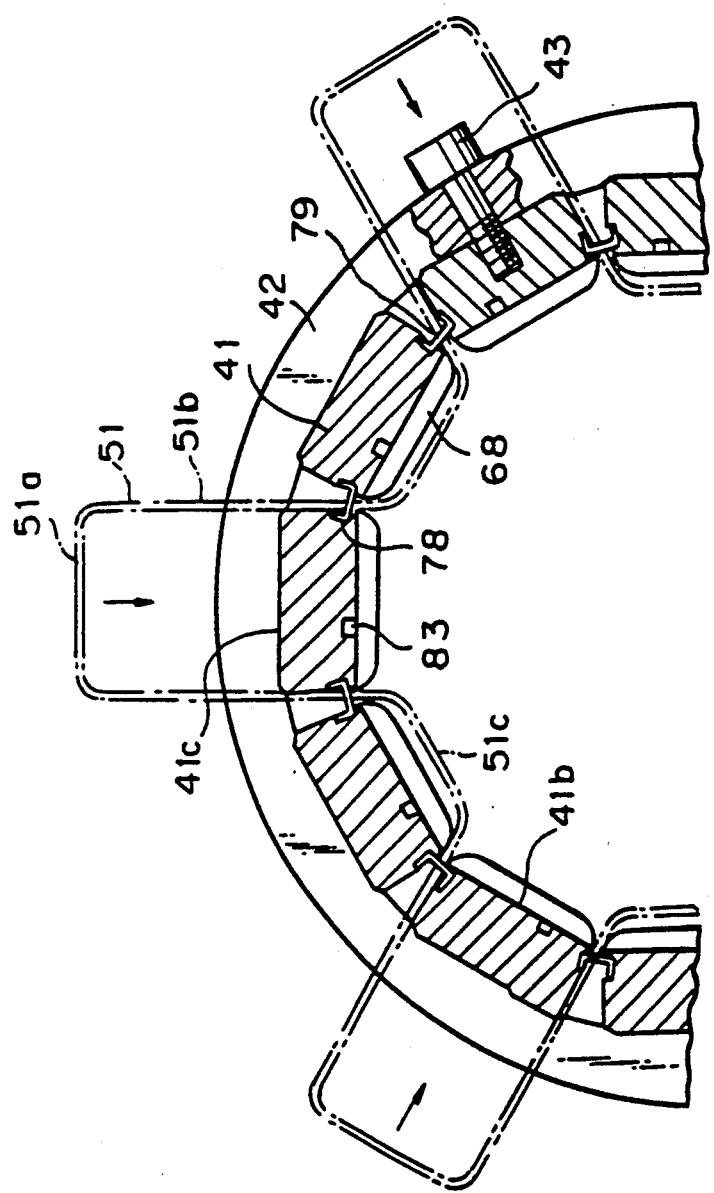
FIG. 9 is an illustration showing the relationship between a wedge holder, a blade and the stator coil to be inserted.

In the coil stripper section D, the stripper 66 for inserting the stator coil 51 and the wedge pusher 81 for inserting the wedges 78 are coupled, and the coupled assembly of the stripper 66 and the wedge pusher 81 is positioned at a predetermined angular position. The assembly is axially movable in synchronism with an axial movement of the coil clamper 48, by the hydraulic cylinder 77, and to guide each stator coil 51 into each slot 46a, the upper ends 68a of the blades are in contact with the lower ends 52b of the clamping guide 52. FIG. 9 shows the relationship between the wedge holder and the stator coil to be inserted.

As shown, the twelve wedge holders 41 are circumferentially arranged on the annular body 42, while mating the outer surfaces 41c thereof with the inner periphery of the annular body 41, and are secured in place by the fastening bolts 43. The wedge holders 41 are circumferentially spaced from each other, to define therebetween clearances 79, and wedges 78 are disposed within the clearances 79 corresponding to the stator coil 51 including the outer interconnecting sections 51a, intermediate sections 51b, and the inner interconnecting sections 51c. A recess and conforming projection 83 are formed on the mating inner periphery of the wedge holder 41 and the outer periphery of the blade 68, to facilitate the relative positioning of the wedge holder and the corresponding blade. The wedge holders 41 are arranged so as to radially align the clearances 79 with the center axes of respective corresponding slots 46a of the stator core 46.

Figure 10:
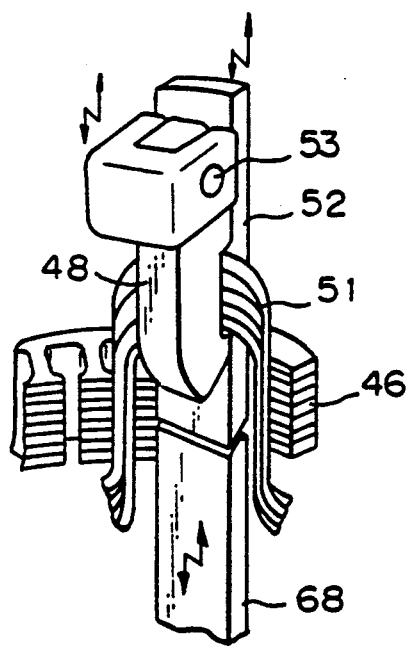
FIG. 10 is a perspective view showing the drawing insertion of the stator coil when using the coil clamper.
Figure 11:
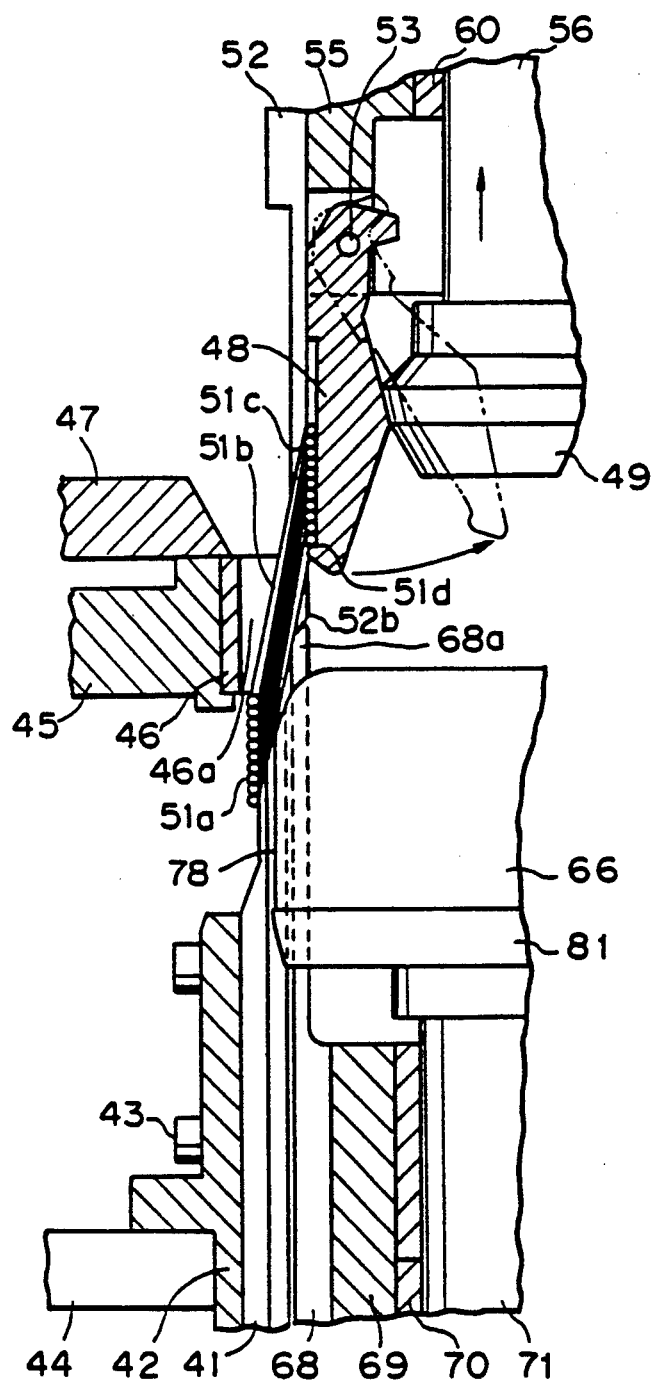
FIG. 11 is a sectional view showing the drawing insertion of the stator coil when using the coil clamper.

The operation of the coil insertion device constructed as set forth above will be discussed below. To insert the stator coil 51 and the wedges 78 into the slots 46a, the stator coil 51 is set in the clearances 79 of the wedge holders 41, as shown in FIG. 9. The wedges 78 are also set in the clearances 79. After completion of preparation for insertion by setting the stator coil 51 and the wedges 78 as set forth above, which condition is illustrated in FIG. 6, the coil inserting operation is initiated. First, the annular body 42 on which the wedge holders 41 are secured is shifted upward together with the plate 44, by a hydraulic cylinder (not shown). The upward movement of the plate 44 carrying the annular body 42 and the wedge holders 41 is terminated when the upper ends 41a of the wedge holders 41 come into contact with the lower surface 46b of the stator core 46, and then the base 57 positioned above the stator core 46 is actuated to be moved downward. The downward movement of the base 57 is continued until the thicker wall section 52a of the clamping guide 52 reaches the upper surface 46c of the stator core 46. As shown in FIG. 7, the projections 52d of the clamping guides 52 engage with the entrance openings 84 of the slots 46a of the stator core 46 to thereby precisely position the clamping guides relative to the stator core. During this downward movement, the outer peripheries 52c of the clamping guides 52 slide along the inner periphery 41b of the corresponding wedge holders 41b. After terminating the downward movement of the base 57 carrying the clamping guides 52, the plate 75 is driven upward while carrying the stripper 66 and the blades 68, and this upward movement of the plate 75 with the stripper 66 and the blades 68 is continued until the upper ends 68a come into contact with the lower ends 52b of the clamping guides 52. After terminating the upward movement of the plate 75, the clamping cylinder 58 is actuated to drive the ring cam 49 downward. This downward movement of the ring cam 48 causes the coil clampers 48 to be pivoted and clamp the inner interconnecting sections 51c of the stator coil 51 between then and the clamping guide 52, as shown in FIG. 7. FIG. 9 shows a side view of the device at this position. FIG. 10 is a perspective schematic view showing the drawing insertion of the stator coil 51, and FIG. 11 is a sectional view also showing the drawing insertion. In the drawing insertion, the base 57 is driven upward with the clamping guides 52, and due to the upward movement of the base 57, the coil clampers 48 clamping the inner interconnection sections 51c of the stator coil 51 are also moved upward. As a result, the outer interconnecting sections 51a shown in FIG. 9 are radially shifted toward the outer peripheries 41c of the wedge holders 41, and axially shifted toward the lower surface 46b of the stator core 46, and at this time, the intermediate sections 51b of the stator coil 51 are drawn into the slot 46a. As shown in FIG. 11, because of the large drawing angle, the conductors of the stator coil 51 can be vertically aligned at the drawing side. Therefore, as shown in FIG. 10, it becomes easy to insert the aligned conductors of the stator coil 51 into the slots 46a without disturbing the alignment thereof. During the drawing insertion, the blades 68 drives the plate 75 upward in synchronism with an upward movement of the base 57 with the clamping guides 52, and therefore, the upper ends 68a of the blades 68 are maintained in contact with the lower ends 52b of the clamping guides 52. Maintaining the upper ends 68a of the blades 68 in contact with the lower ends 52b of the clamping guides 52 protects the intermediate sections 51b of the coil 51 by guiding the latter when they enter the slots 46a through the entrance openings 84, since damage may occur to the intermediate sections 51b, When the lowermost conductor 51d in the inner interconnecting sections 51c reaches the level of the upper surface 46c of the stator core 46, the upward movement of the clamping guide 52 and the blade 68 is terminated. Then, the ring cam 49 is driven upward by the clamping cylinder 58 to release the inner interconnecting sections 51c from the coil clampers 48, and after the unclamping, the clamping guides 52 and the blades 68 are again driven upward. The upward movement of the clamping guides 52 and the blades 68 is terminated at the position where the upper end 68a of the blades 68 is placed at a level 3 to 5 mm higher than the upper surface 46c of the stator core 46.

Figure 12:
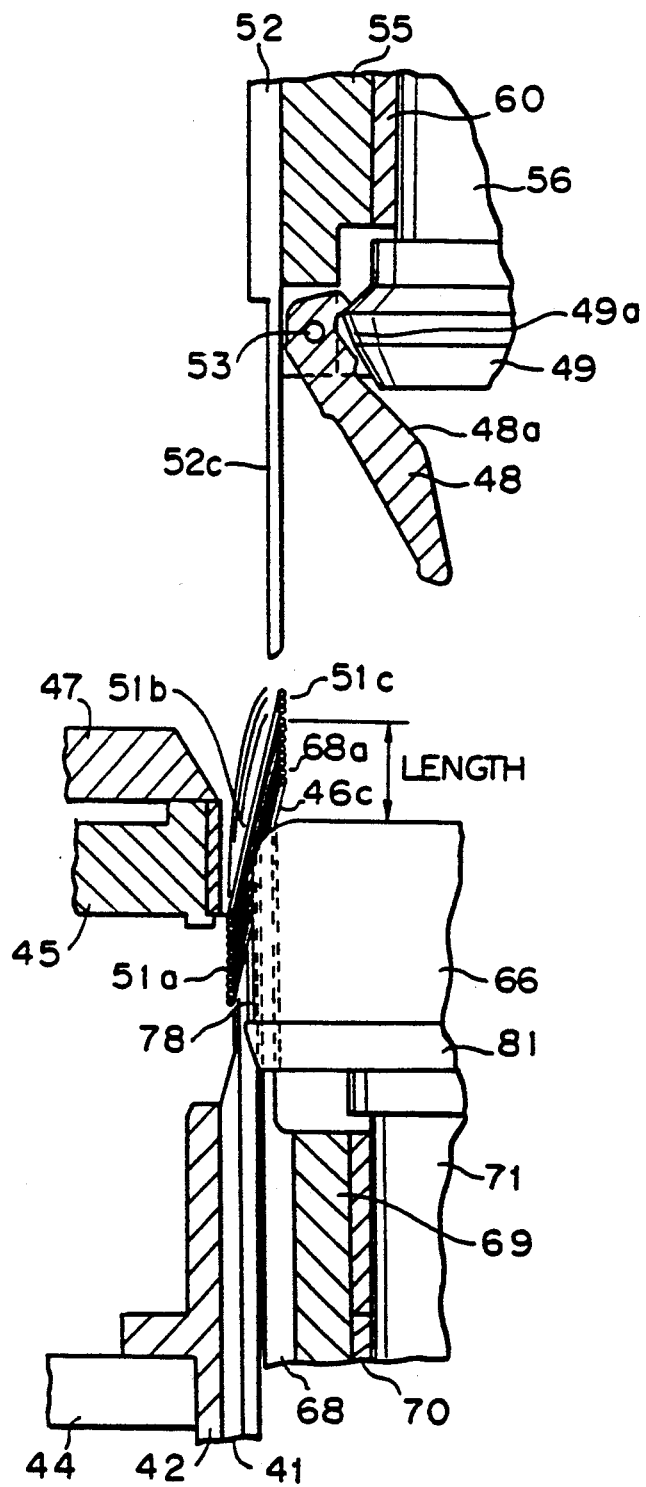
FIG. 12 is a sectional view showing the pushing insertion of the stator coil when using a stripper.

At this position, a pushing insertion by the stripper 66 is initiated. FIG. 12 is a sectional view showing the pushing insertion. At the point where the upper ends 68a of the blades 68 are positioned 3 to 5 mm higher than the upper surface 46c of the stator core 46, the blades 68 stops, and at this position, the clamping guides 52 are again driven upward, to return to the initial position thereof.

During the drawing insertion, the stripper 66 is shifted upward together with the blades 68, and thus, at the end of the drawing insertion, the stripper 66 is at a position for instantly starting a pushing insertion. Therefore, immediately after completing the upward movement of the clamping guides 52, the actuation cylinder 77 starts to drive the stripper 66 upward together with the wedge pusher 81, for a stroke l (LENGTH) in FIG. 12. During this upward travel of the stripper 66, the radial projections 80 pushes the inner interconnecting sections 51c and the intermediate sections 51b into the slots 46a. Also, the wedges 78 are pushed upward by the pushing projections 81a of the wedge pusher 81 simultaneously with the coil 51. The insertion operation is completed when the wedge pusher 81 reaches a position 1 to 3 mm lower than the lower surface 46b of the stator core 46. After completing the inserting operation, the blades 68 are driven downward together with the stripper 66 to the initial position, to thus finish one cycle of operation.

Therefore, in the shown embodiment, the stator coil 51 is inserted into the slots 46a of the stator core 46 prior to the loading of an insertion load on the stator coil by clamping and drawing the coil, in a substantial ratio. In the preferred proportion, the drawing insertion and pushing insertion is made 80% by a drawing insertion and the remaining 20% is by a pushing insertion. As can be appreciated, by a drawing insertion which is performed prior to a pushing insertion, a misalignment of the coil at the initial stage of the inserting operation can be satisfactorily prevented. Furthermore, as set forth above, by employing the drawing insertion, the coil 51 can be inserted while maintaining the aligned position thereof. Also, since the conductors of the stator coil 51 are maintained free from contact with the stripper 66 until the pushing insertion is initiated, it can be maintained substantially in a straight line. This allows a higher density of the inserted coil in the slots of the stator core.

The foregoing discussed a coil inserting operation in which a necessary number of conductors of the stator coil 51 are inserted with the wedges 78 by a one stage inserting operation.

Figure 13:
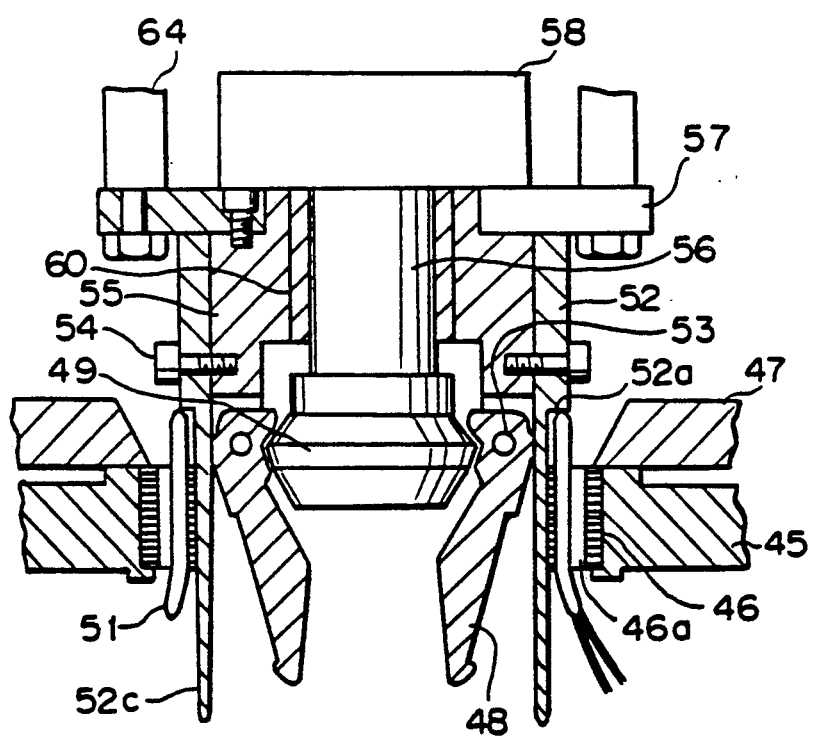
FIG. 13 shows the holding of the inserted stator coil when the wedge is not inserted simultaneously with the coil.
Figure 14:
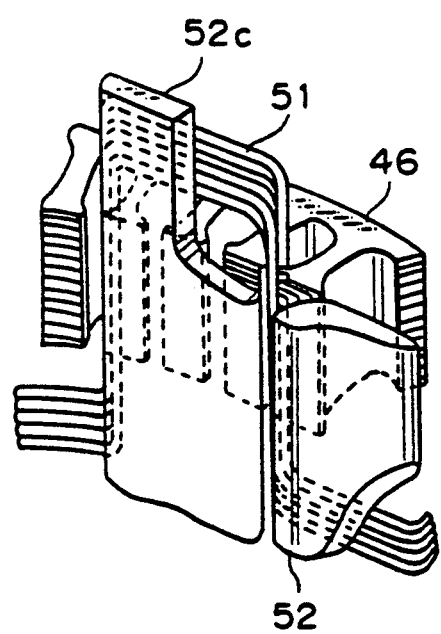
FIG. 14 is a perspective view showing details of the relationship between the stator coil, a stator core and the clamp guide.

In an alternative embodiment, the coil 51 and the wedges 78 are inserted separately from each other and the necessary number of the conductors of the stator coil are inserted by a plurality of stages of the inserting operations. Even in this case, the insertion process is the same as that discussed above, in which all of the necessary number of conductors are inserted by a one stage operation. The process becomes different after the completion of the insertion, as illustrated in FIG. 12. Namely, after the required stroke l of upward movement of the stripper 66 to complete the inserting operation, if the stripper 66 and the blades 68 are simply moved downward, the inserted stator coil 51 can fall out of slots 46a. To prevent this, in accordance with the shown embodiment, the clamping guides 52 are driven downward until the lower ends 52b thereof reach the upper surface of the stripper 66. After the lower ends 52b of the clamping guides reach the upper surface of the stripper 66, the stripper 66 and the blades 68 are driven downward, and in synchronism with downward movement of the stripper 66 and the blades 68, the clamping guides 52 are also driven downward. FIG. 13 shows the position in which the inserted coil 51 is held within the slots 46a without inserting the wedges 78. As can be seen, the outer surface 52c of the clamping guide 52 mates with the entrance openings 84 of the slots 46a, to depress the coil 51 radially outwardly, and therefore, the coil 51 within the slots 46a cannot fall out of the slots 46a. By further driving the clamping guides 52 downward, the clamping guides 52 are placed at a position at which the drawing insertion is initiated. At this position, the lower end of the thicker section 52a of the clamping guides 52 does not reach the upper surface 46c of the stator core 46 but stops at a position in contact with the upper end of the coil 51. FIG. 14 is a perspective view showing the relationship between the stator core and the clamping guides. As shown in FIG. 14, the portion of the coil 51 extending from the stator core 46 can be held by the outer surface 52c of the clamping guides 52, and therefore, the portion of the coil 51 within the slots 46a can not fall out therefrom. Thus, by the process set forth above, the coil can be maintained in the slots without the inserting of wedges, and this permits an insertion of the coils by dividing the necessary number thereof into a plurality of groups. Also, by reducing the number of conductors to be inserted at one stage of the inserting operation, the insertion load can be significantly reduced by, e.g., less than half. This combination of a dividing insertion and drawing insertion makes it possible to produce a stator assembly having remarkably enhanced quality.

Practically, the wedges 78 can be inserted from above by separating the inserting operations for the coil 51 and the wedges. Such as approach is advantageous in that it allows a wider adjustment range and avoids a restriction of the length in application. Furthermore, since the coil is not pushed but drawn into the slots, the pressure required for inserting the coil becomes much smaller than that for purely pushing the coil into the slots, e.g. less than or equal to 400 kg. Also, because of the small force required, it becomes unnecessary to use a centering tool.

It should be appreciated that, although the present invention has been specified by the shown embodiments, it can be implemented in other ways. For example, the cylinder 58 can be a pneumatic type, hydraulic type, or can be replaced by an electric actuator or motor. Also, the timing of the coil inserting operation can be different from that disclosed above. For instance, drawing insertion and pushing insertion may be performed simultaneously.

As set forth above, according to the present invention, the aligned stator coil is clamped and drawn while maintaining an aligned condition thereof when the coil is drawn into the slots. Also, since the drawing angle can be made large, the conductors of the stator coil at the drawing side can be in a vertical alignment, and thus the coil can be made much thinner than that of the prior art, which reduces the size and weight of the product and provides a higher output, to thereby provide a higher quality product. Also, since the pushing insertion is performed only by a small stroke at the final stage of the inserting operation, damage to the insulating layer on the conductor can be reduced to lessen the occurrence of a defective product, such as a protruding of the coil from the slots or a breakage of the conductor, to thus provide a remarkably high yield.

Furthermore, since the present invention can maintain the coil within the slots without inserting the wedges, the coil and wedges can be inserted separately. This also permits a divided insertion of necessary number of a conductors for a plurality of stages of the inserting operation, and thus the force required for inserting the coil can be reduced. A further advantage can be obtained by combining the drawing insertion and dividing insertion, to facilitate the production of higher quality products. Furthermore, the present invention can be advantageously combined with the conventional process for the insertion of FMS winding.

We claim:

1. A coil insertion device for inserting a prewound stator coil into slots in a stator core, said coil insertion device including a base body that is arranged annularly below said stator core and has clearances arranged for maintaining said prewound stator coil, the centers of said clearances being aligned with centers of said slots, said device comprising:
    a plurality of clamping guides movable along inner surfaces of said stator core and said base body and being circumferentially arranged in a substantially regularly spaced relationship;
    a plurality of coil clampers arranged radially inward and in opposition to said clamping guides for clamping said prewound stator coil in a position whereby said prewound stator coil is aligned with said clamping guides and for shifting upward according to an upward movement of said clamping guides for drawing said stator coil into said slots with a given angle of tilting;
    a stripper extending through said base body to push said stator coil into said slots by an upward movement thereof after insertion of said stator coil by said coil clampers; and
    a plurality of blades movable along the inner surfaces of said base body to move said stripper synchronously, said blades being formed into essentially the same configuration and having essentially the same arrangement as said clamping guides.

2. The coil insertion device as set forth in claim 1, wherein said coil clampers clamp the said stator coil held in said clearances at points on the inner surface of said clamping guides.

3. The coil insertion device as set forth in claim 1, wherein said clamping guides are synchronously movable with said blades.

4. The coil insertion device as set forth in claim 1, wherein said coil insertion device is adapted to dividingly insert a plurality of conductors of said stator coil into each of said slots through a plurality of cycles of inserting operations without inserting wedges, and said coil insertion device is adapted to simultaneously insert said coductors and wedges at a final cycle of an inserting operation.

5. A coil insertion device for inserting a prewound stator coil into slots in a stator core, said coil insertion device including a base body that is arranged annularly below said stator core and has clearances arranged for maintaining said prewound stator coil, the centers of said clearances being aligned with centers of said slots, said device comprising:
    a plurality of clamping guides movable along inner surfaces of said stator core and said base body and being circumferentially arranged in a substantially regularly spaced relationship;
    a plurality of coil clampers arranged radially inward and in opposition to said clamping guides for clamping said prewound stator coil in a position whereby said prewound stator coil is aligned with said clamping guides and for shifting upward according to an upward movement of said clamping guides for drawing said stator coil into said slots with a given angle of tilting;
    a stripper extending through said base body to push said stator coil into said slots by an upward movement thereof after insertion of said stator coil by said coil clampers, wherein said clamping guide is disposed to move downward in synchronism with a returning motion of said stripper to block said slots and prevent said stator coil from protruding from said slots after a drawing insertion of said stator coil by said clamping guide and a pushing insertion by said stripper, thereby permitting a necessary number of conductors of said stator coil to be inserted in said stator coil core through a plurality of cycles of inserting operations; and
    a plurality of blades movable along the inner surface of said base body to move said stripper synchronously, said blades being formed into essentially the same configuration and having essentially the same arrangement as said clamping guides.

* * * * *